J. T. H. PAUL.
PASTEURIZING APPARATUS.
APPLICATION FILED MAR. 13, 1908.
907,639.
Patented Dec. 22, 1908.
11 SHEETS—SHEET 2.
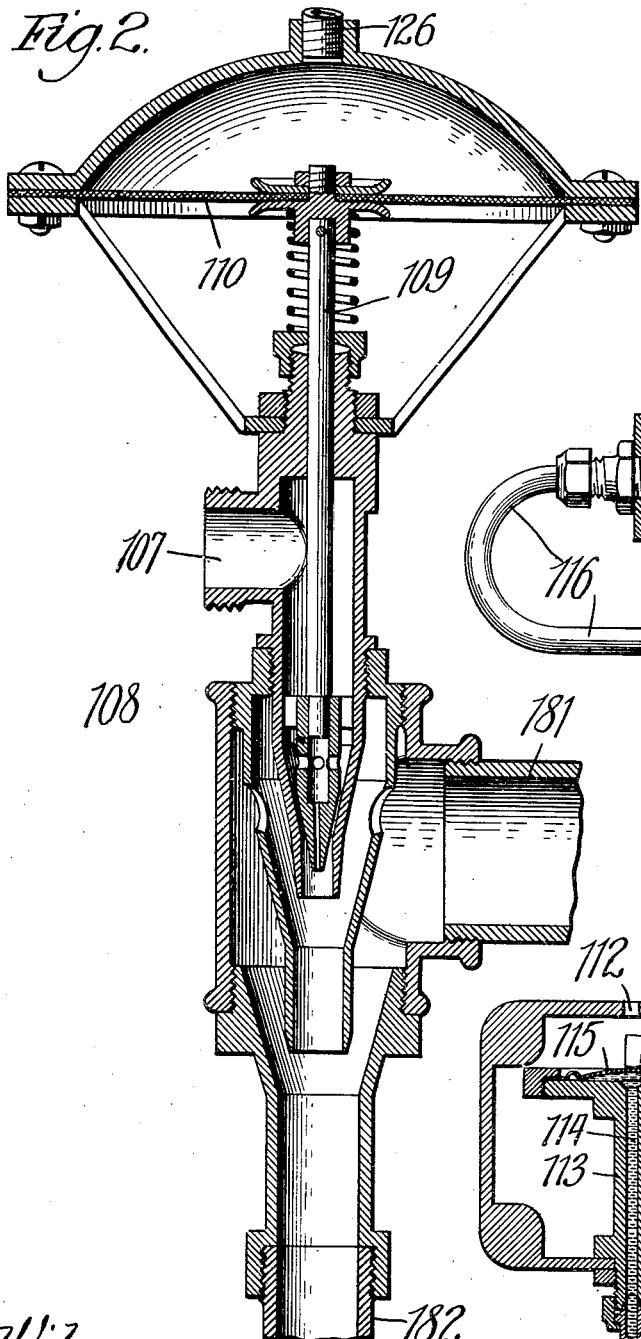
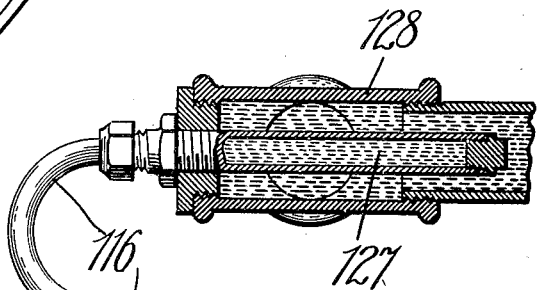
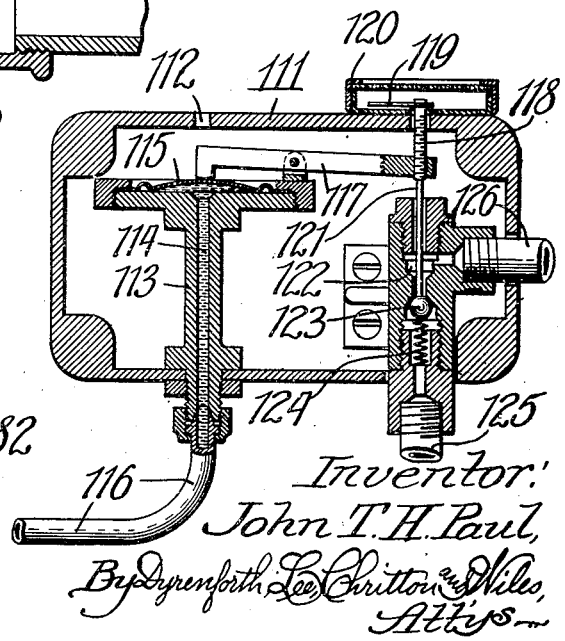
Witnesses:
Gaylord,
John Enders.
Inventor:
John T. H. Paul,
By Dyrenforth, Lee, Chritton and Wiles,
Attys.

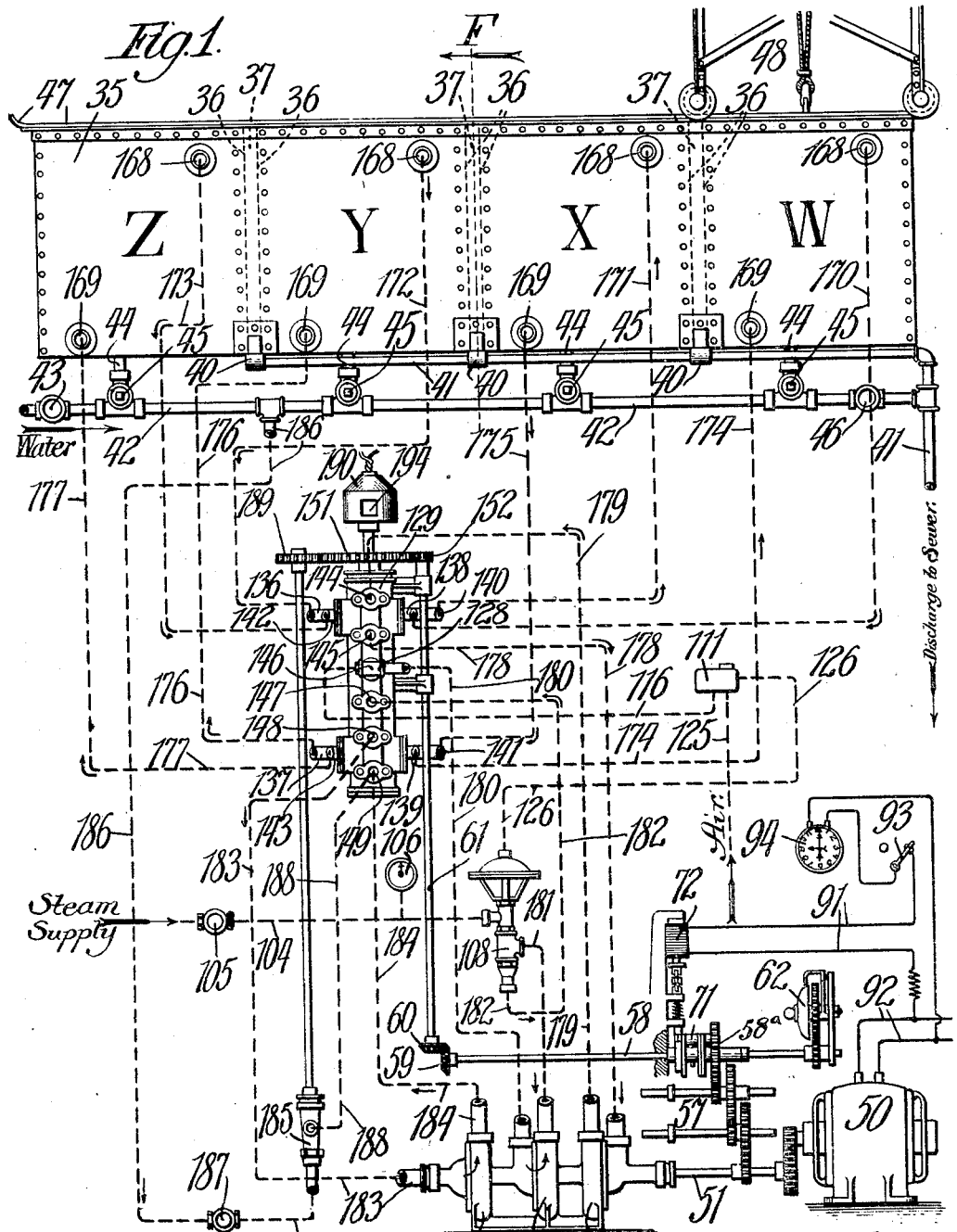

J. T. H. PAUL.
PASTEURIZING APPARATUS.
APPLICATION FILED MAR. 13, 1908.
907,639.
Patented Dec. 22, 1908.
11 SHEETS—SHEET 3.
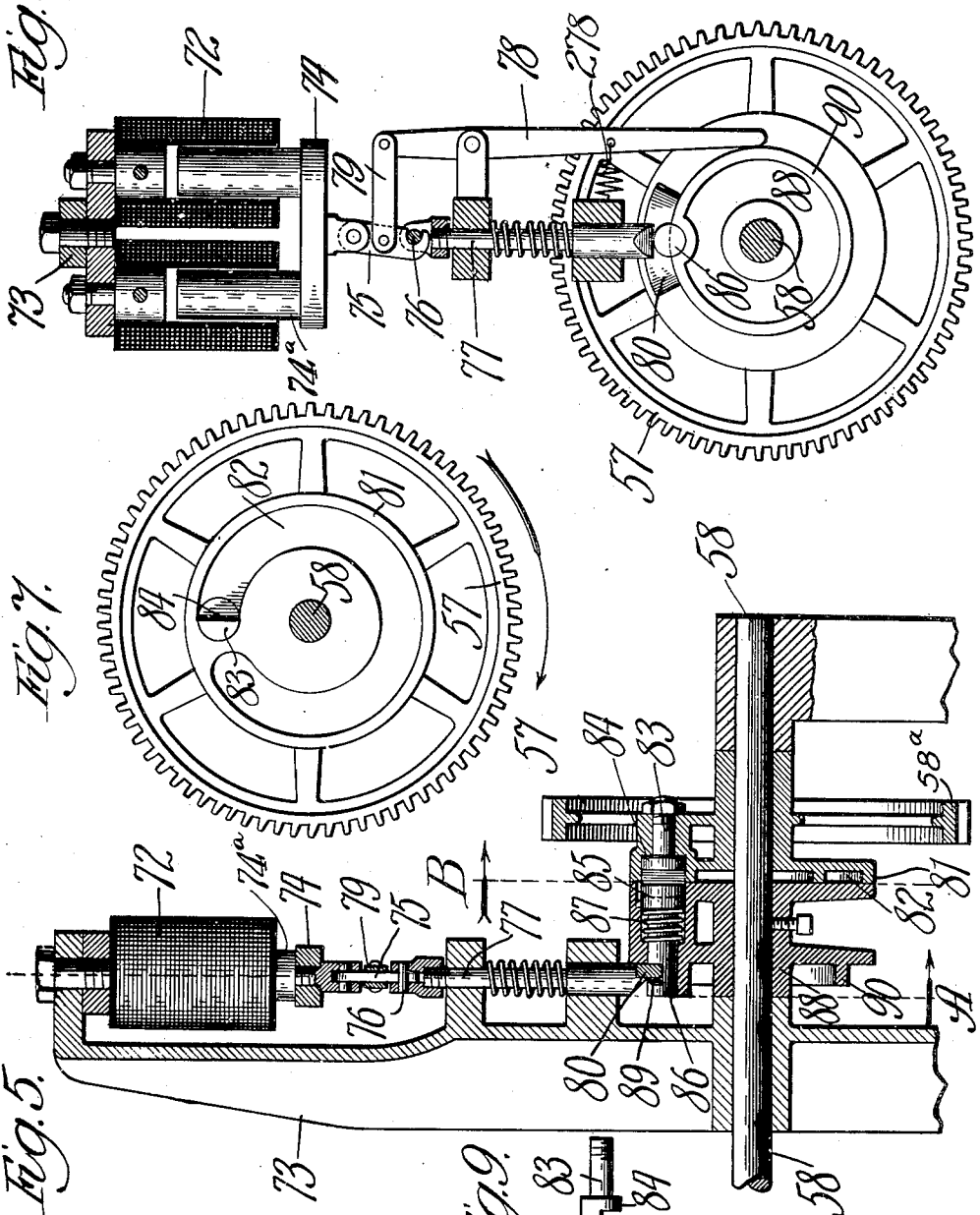

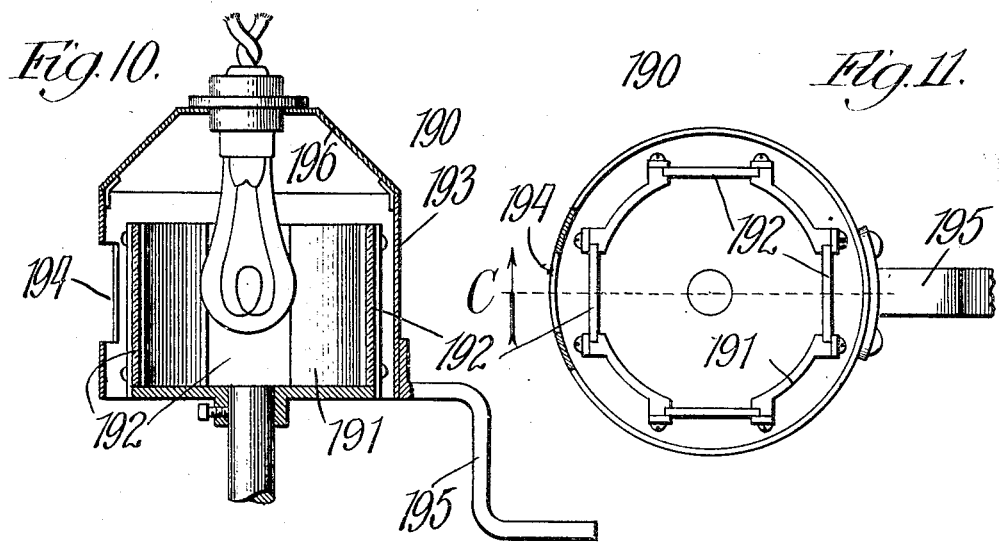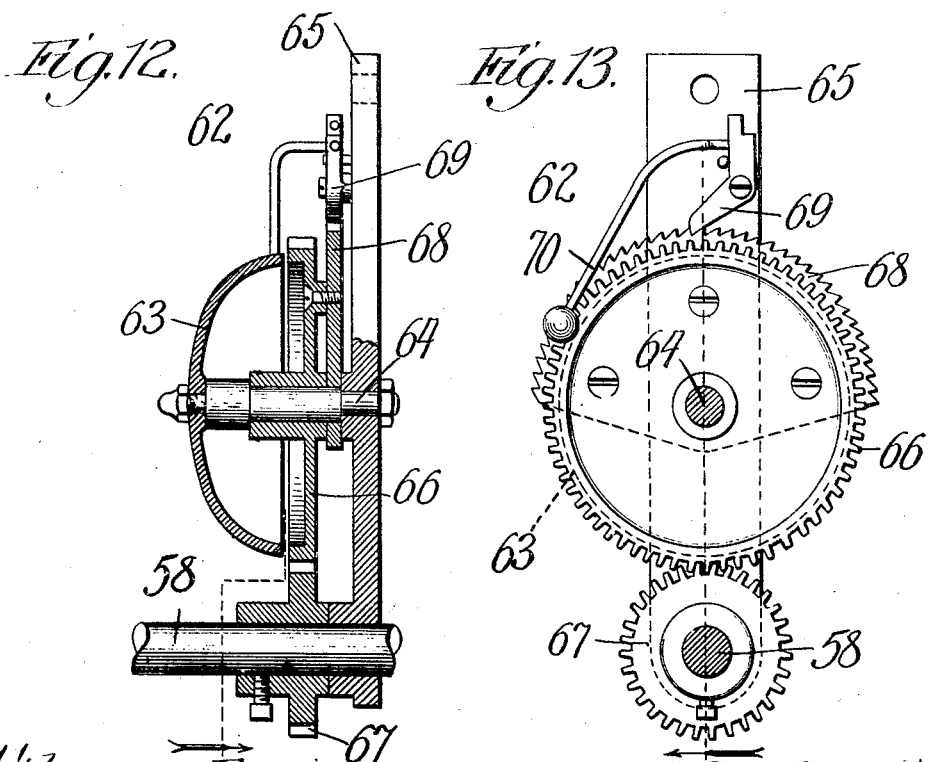

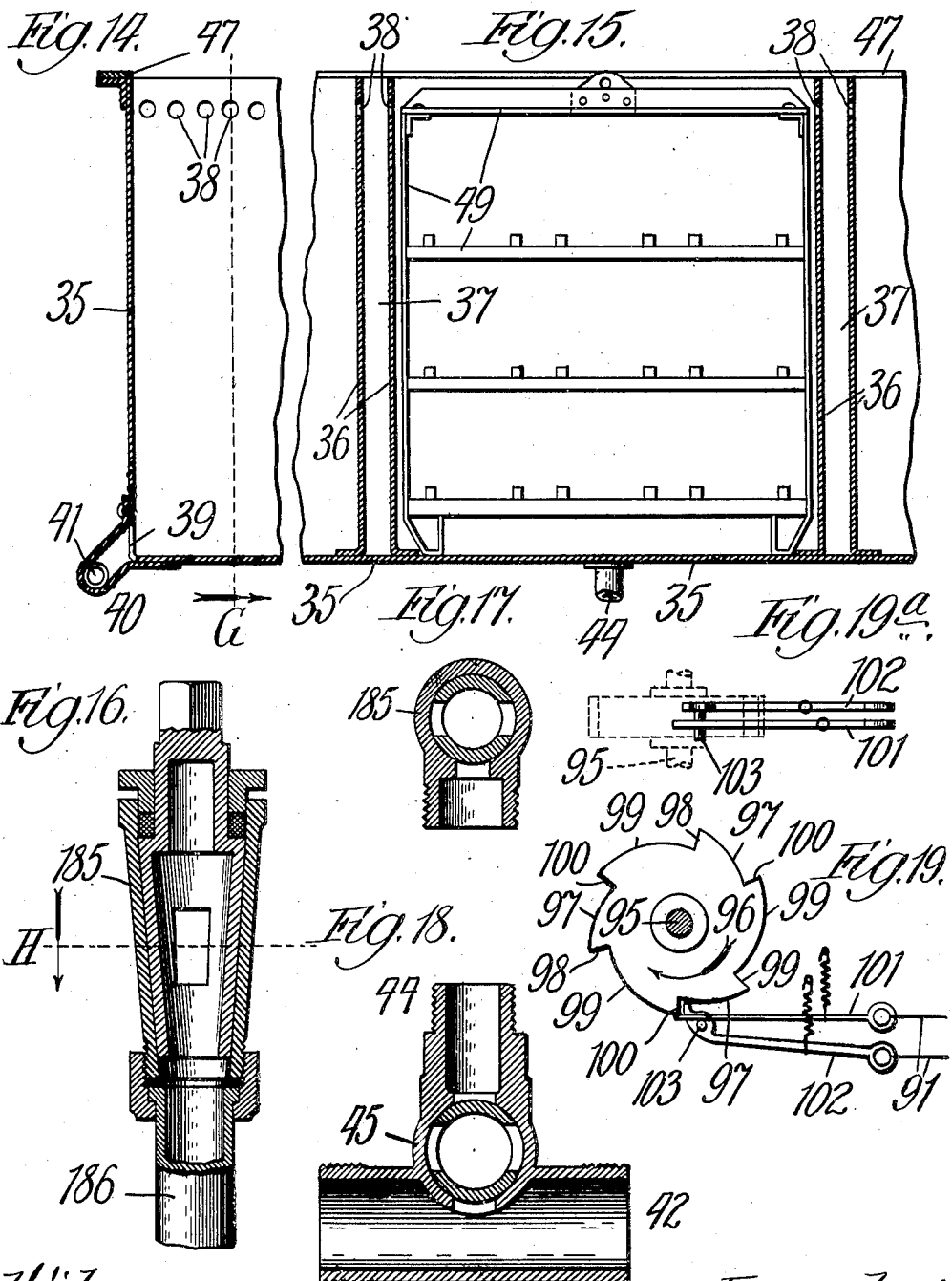

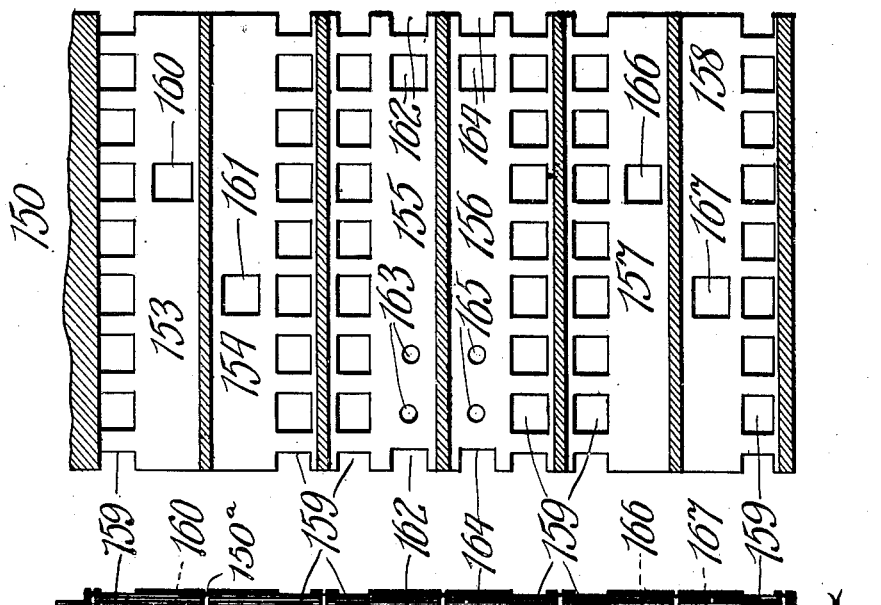

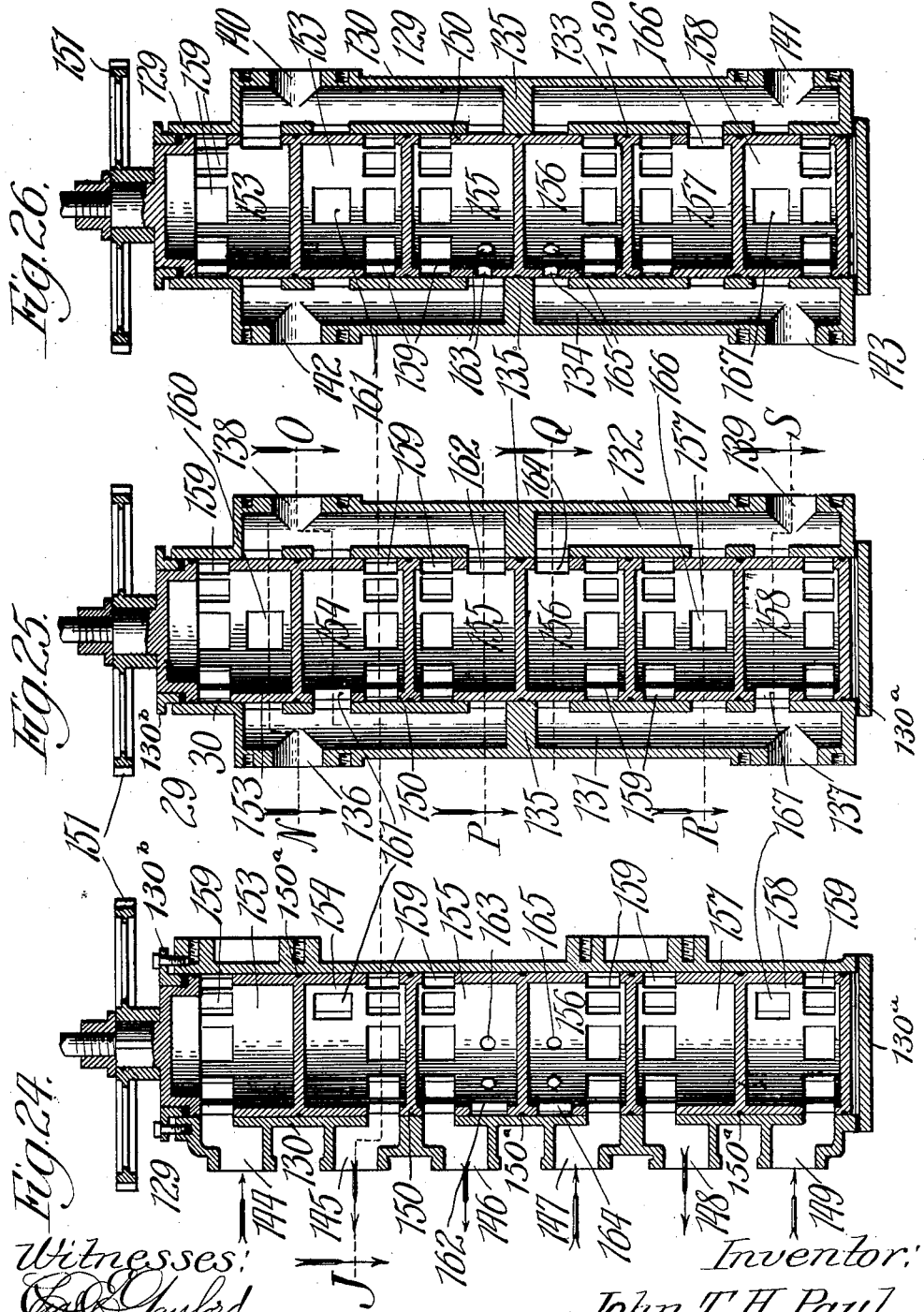

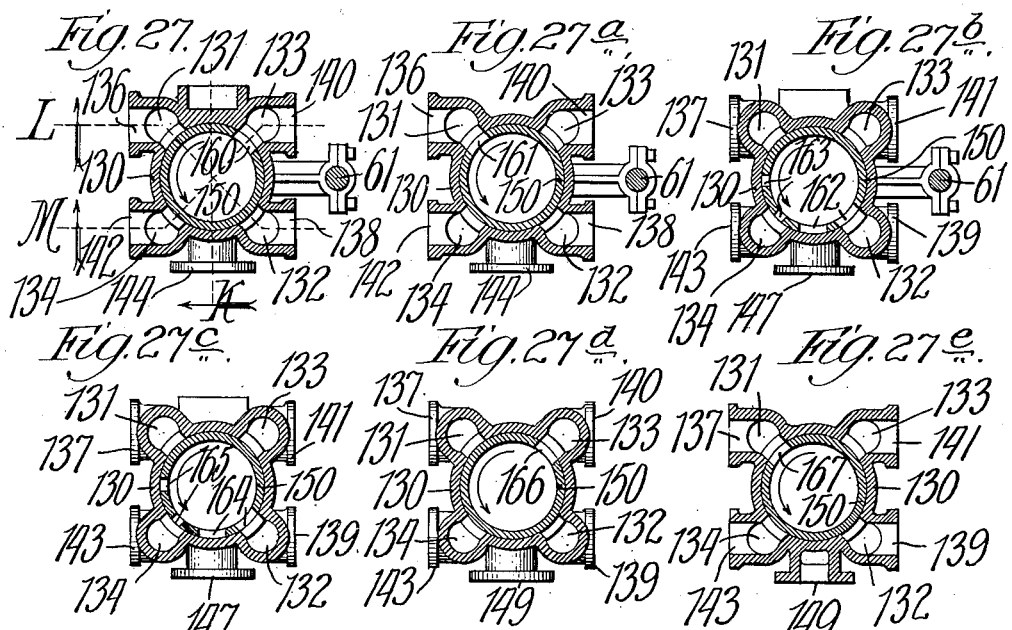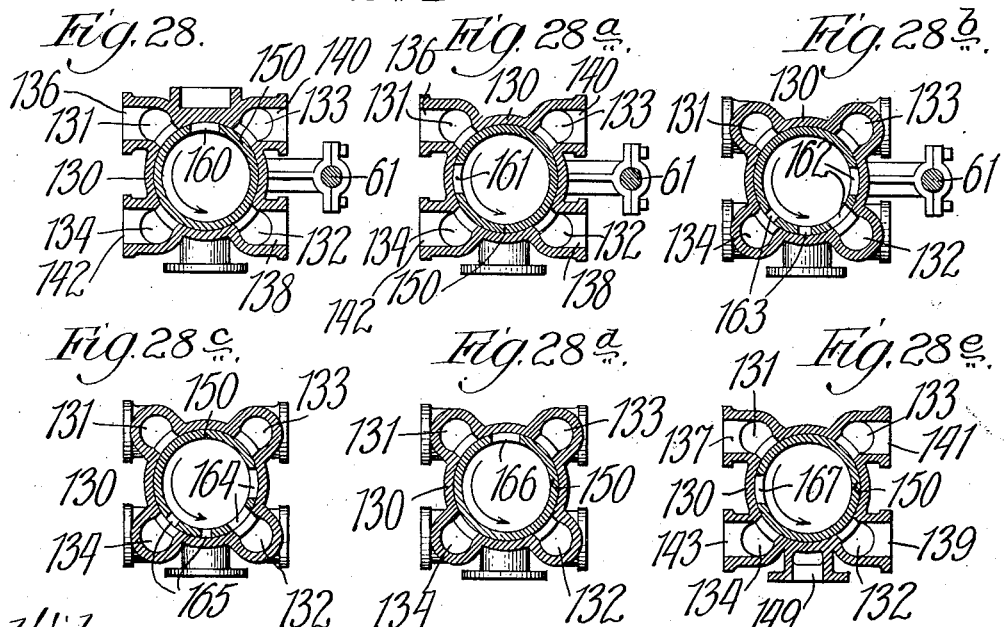

J. T. H. PAUL.
PASTEURIZING APPARATUS.
APPLICATION FILED MAR. 13, 1908.

3rd Position.

4th Position.

Witnesses:
Chas. L. Gaylord.
John Enders

Inventor:
John T. H. Paul,
By Dyrenforth, Lee, Chritton & Wiles,
Attys.

5th Position.

6th Position.

J. T. H. PAUL.
PASTEURIZING APPARATUS.
APPLICATION FILED MAR. 13, 1908.

7th Position.

8th Position.

Witnesses:
Inventor:
John T. H. Paul

UNITED STATES PATENT OFFICE.

JOHN T. H. PAUL, OF CHICAGO, ILLINOIS, ASSIGNOR TO E. GOLDMAN & CO., INC., OF CHICAGO, ILLINOIS, A CORPORATION OF ILLINOIS.

PASTEURIZING APPARATUS.

No. 907,639.　　　　　Specification of Letters Patent.　　　　Patented Dec. 22, 1908.

Application filed March 13, 1908. Serial No. 420,792.

*To all whom it may concern:*

Be it known that I, JOHN T. H. PAUL, a citizen of the United States, residing at Chicago, in the county of Cook and State of Illinois, have invented a new and useful Improvement in Pasteurizing Apparatus, of which the following is a specification.

This invention relates to an improvement in the type of pasteurizing machine in which a plurality of tanks are employed for containing sterilizing water at different interchangeable temperatures, and into which is introduced the material to be treated (in bottles or other forms of packages), to be subjected in each compartment to the successive temperatures required in the practice of pasteurization.

Figure 29:
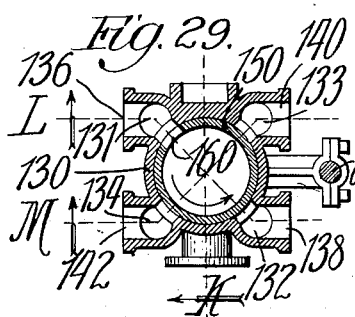
Figure 29A:
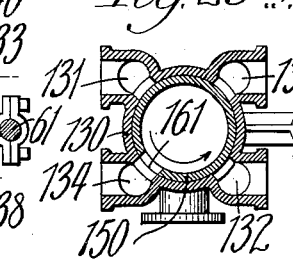
Figure 29B:
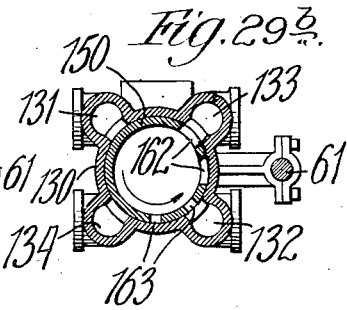
Figure 29C:
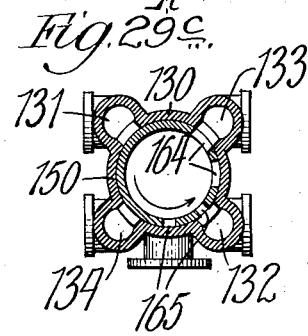
Figure 29D:
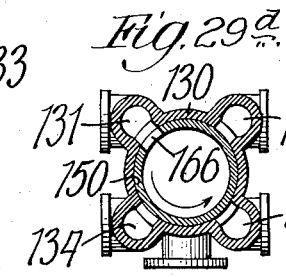
Figure 29E:
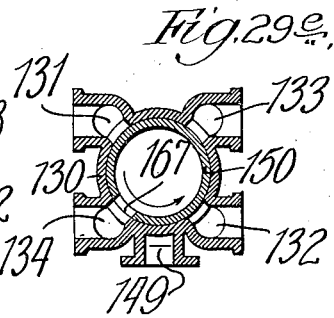
Figure 30:
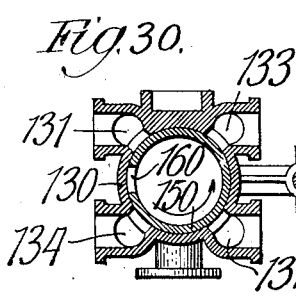
Figure 30A:
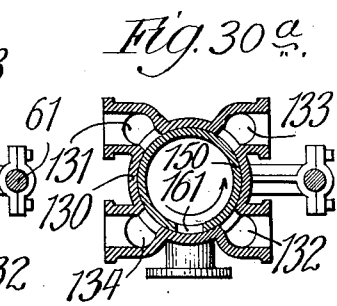
Figure 30B:
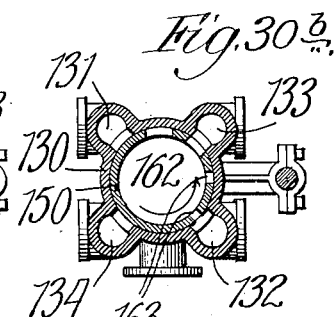
Figure 30C:
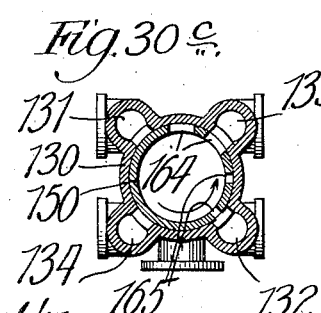
Figure 30D:
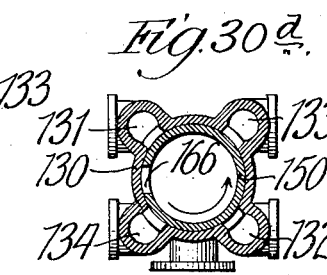
Figure 30E:
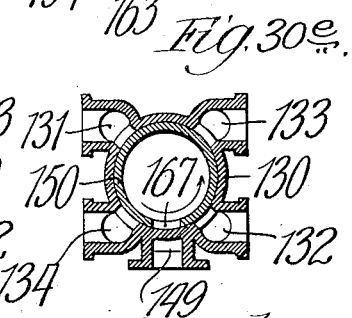
Figure 31:
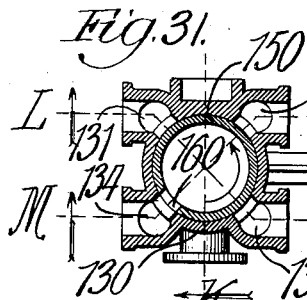
Figure 31A:
Figure 31B:
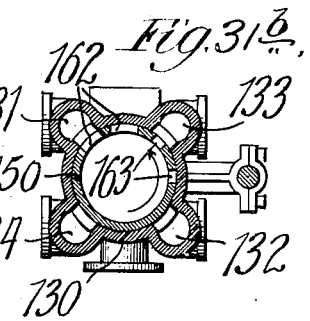
Figure 31C:
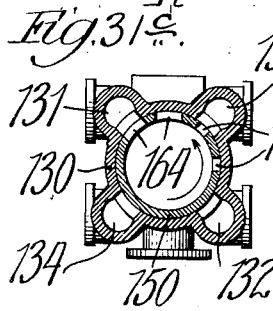
Figure 31D:
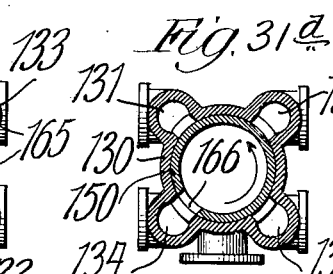
Figure 31E:
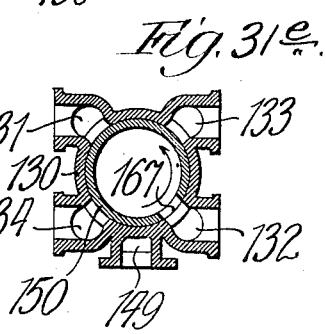
Figure 32:
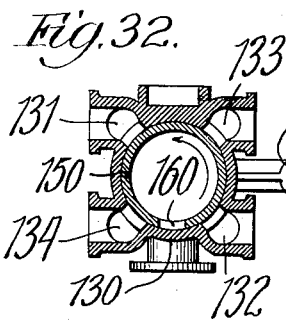
Figure 32A:
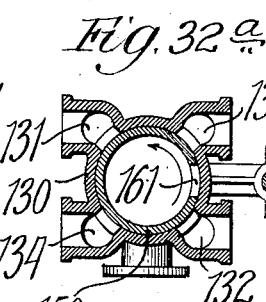
Figure 32B:
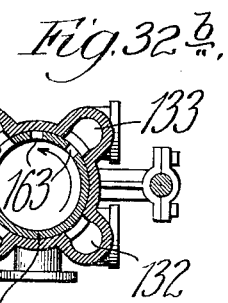
Figure 32C:
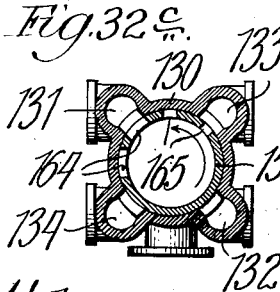
Figure 32D:
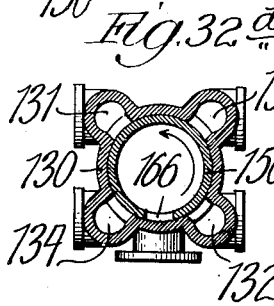
Figure 32E:
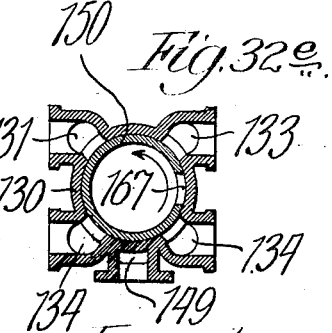
Figure 33:
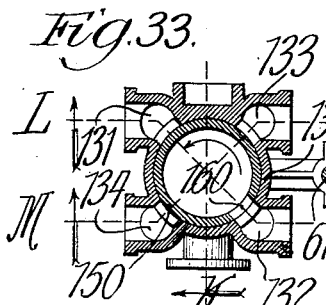
Figure 33A:
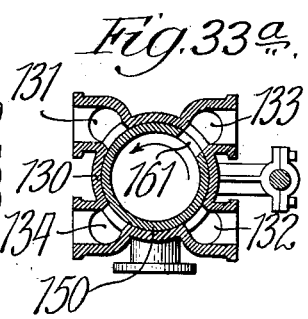
Figure 33B:
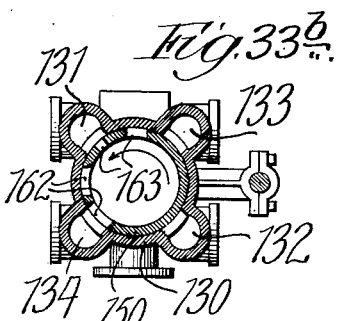
Figure 33C:
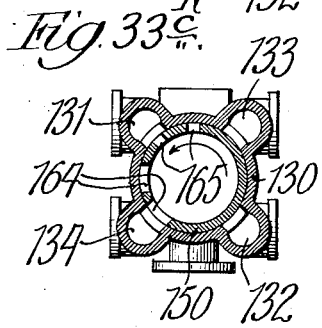
Figure 33D:
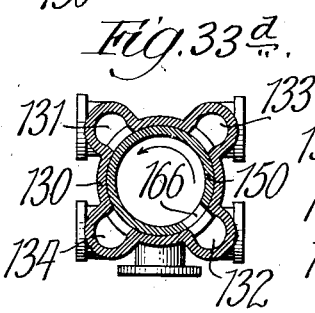
Figure 33E:
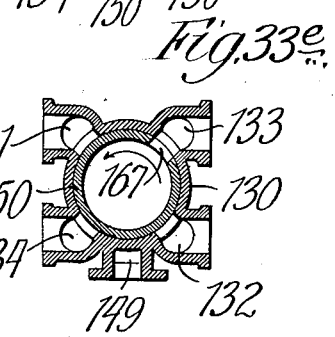
Figure 34:
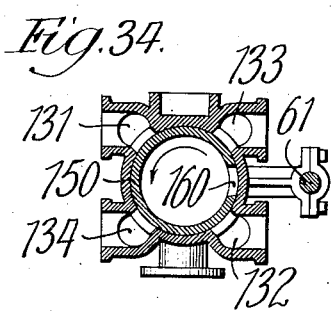
Figure 34A:
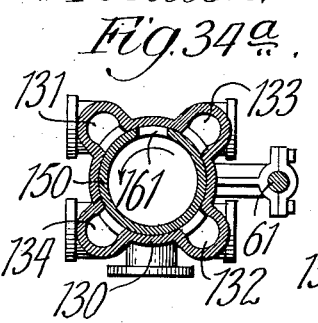
Figure 34B:
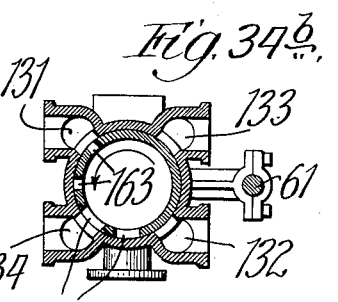
Figure 34C:
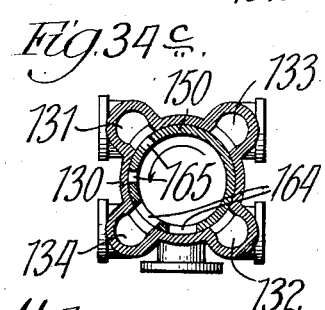
Figure 34D:
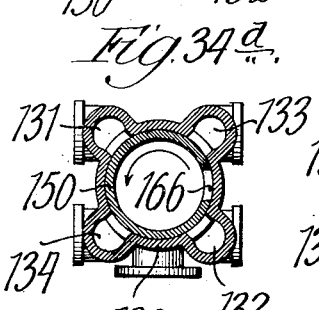
Figure 34E:
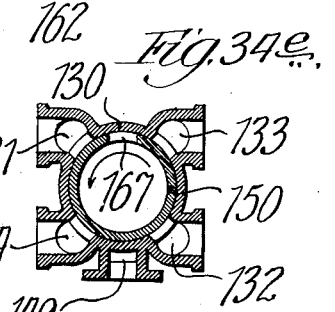

The primary object of the invention is to render the machine, after it has once been started, thoroughly automatic throughout a complete run, so that no manipulation or attention shall be required on the part of the operator, except for introducing into and taking out of the tanks the material under treatment. This and other objects are accomplished by the mechanism illustrated in the accompanying drawings, in which Figure 1 is a diagram of the entire machine; Fig. 2, an enlarged broken view showing the steam-jet device in section; Fig. 3, a similar view of the thermostat-device employed; Fig. 4, a similar view of the diaphragm-controlled valve-device coöperating with the thermostat for controlling the operation of the steam-jet device; Fig. 5, an enlarged broken view showing the magnet-controlled clutch-device in section, Fig. 6, a section on line A, Fig. 5, Fig. 7, a section on line B, Fig. 5, Fig. 8, a sectional view of a detail of the clutch, and Fig. 9, a view showing the two engaging members of the clutch-device in elevation; Fig. 10, an enlarged sectional view of the indicator-head on line C, Fig. 11, and Fig. 11, a broken plan section of the same with the hood removed; Fig. 12, a broken section of the alarm-gong on line D, Fig. 13; and Fig. 13, a section of the same on line E, Fig. 12; Fig. 14 is a broken section on line F, Fig. 1, showing the preferred tank construction, and Fig. 15, a section on line G, Fig. 14; Fig. 16 is a broken view of a supplemental valve employed as an adjunct for supplying additional cooling water to the tanks, and Fig. 17, a section of the same on line H, Fig. 16; Fig. 18 an enlarged section of one of the shut-off valves in the filling-pipe for the tanks; Figs. 19 and 19ᵃ are views showing, respectively in side elevation and plan, the clock-controlled electric-contact mechanism for automatically operating the clutch-device; Fig. 20 is a plan view, with the surmounting gear-wheel removed, of the multiple-valve device through which the sterilizing operations in all the tanks are automatically controlled; Fig. 21, a view in elevation of the hollow valve-plug, and Fig. 22, a developed section on line I, Fig. 21; Fig. 23, a section on line J, Fig. 24; Figs. 24, 25 and 26 are sections respectively on lines K, L and M, Fig. 20; Figs. 27 to 27ᵉ, inclusive, are sectional views of the valve, in its "1st position," taken, respectively, on the lines N, O, P, Q, R and S, Fig. 25; Figs. 28 to 28ᵉ, inclusive, are similar views on the same lines, showing the valve in its "2nd position," the "3rd position" thereof being shown in Figs. 29 to 29ᵉ, inclusive, the "4th position," in Figs. 30 to 30ᵉ inclusive, the "5th position" in Figs. 31 to 31ᵉ, inclusive, the "6th position," in Figs. 32 to 32ᵉ, inclusive, the "7th position," in Figs. 33 to 33ᵉ, inclusive, and the "8th position" in Figs. 34 to 34ᵉ, inclusive, all by sections on the said lines on which the figures of said "1st position" are taken.

Four tanks are shown and are denoted as W, X, Y, Z, respectively, though the number employed is not material to the invention. The preferred construction of the tank is that illustrated in Figs. 14 and 15. It involves a continuous body 35, preferably of boiler-iron, for the entire series, bent to U-shape in cross-section, with end-heads flanged and riveted in place through the flanges to the sides and base of the body, in which the similar compartments are formed each by two partitions 36, 36 like the heads and similarly fastened in place in spaced relation to each other to form the overflow chamber 37 having openings 38 in the upper-end portions of the partitions. Each overflow-chamber contains a discharge-opening 39 in its base covered by a shield 40, and these shields are connected by pipe-sections forming the overflow-header 41 which leads to a sewer (not shown). A cold-water supply-pipe 42 containing a shut-off valve 43 connects at its discharge-end with the pipe 41 and communicates with the tanks, through their bases, by branches 44, each branch containing a shut-off valve 45;

and the pipe 42 contains a shut-off valve 46 near its discharge-end. The series of tanks is reinforced about its upper edge with angle-iron forming a seat along the sides for a track 47 on which to run a gauntree indicated at 48, Fig. 1, of any suitable construction, for raising out of and lowering into the tanks, racks 49 carrying crates (not shown) supporting the material to be treated, which, for the purposes of the present case, may be considered to be beer in bottles.

The gist of the invention consists in controlling the temperatures in the different tanks through the medium of a single valve-device of the preferred construction, hereinafter described, which is automatically set at required intervals for the various purposes by suitable mechanism, that shown for the purpose involving the following-described construction and combinations of parts: An electric motor, conventionally illustrated at 50 in Fig. 1, has its armature-shaft geared to a pump-shaft 51, common to three centrifugal pumps 54, 55, 56 of ordinary or any suitable construction. The pump-shaft drives, through the medium of a train of reducing-gears 57, a shaft 58 carrying on one end a miter 59 meshing with a similar miter 60 on the lower end of a vertical shaft 61 for operating the aforesaid valve-device. On the opposite end of the shaft 58 is provided an alarm-device 62 (Figs. 12 and 13), comprising a gong 63 supported on a stud 64 upon a bracket 65 through which the shaft 58 passes, the bracket being adapted to be secured to any convenient stable support; on the stud is rotatably mounted a gear-wheel 66 meshing with a pinion 67 on the shaft 58 and carrying a segmental ratchet 68, with the teeth of which engages a pawl 69 fulcrumed on the bracket and carrying on its free end a hammer 70 for sounding the gong during alternate rotations of the shaft by the tripping action of the ratchet upon the pawl.

The gear 58ª of the reducing-train which is carried by the shaft 58 is loose thereon to avoid rotation of the shaft except at predetermined intervals by engaging therewith said gear through the medium of a clutch-device 71, a suitable construction of which is illustrated in Figs. 5 to 9, inclusive. A solenoid-magnet 72 supported in a bracket 73 has suspended from the armature 74 on its cores 74ª a link 75 which has a releasable hook-connection at 76 with a spring-pressed, vertically movable tripping-pin 77 working in bearings on the bracket, on one of which bearings is fulcrumed a lever 78 having a link-connection 79 with the hook-link for a purpose hereinafter described; the tripping-pin carrying on its lower end a cam-shoe 80. On one face of the gear in the train 57 which is loosely mounted on the shaft 58 is provided a disk 81 having confined in it at one end of a circular recess 82 concentric with the disk, a transverse stationary clutch-pin 83 terminating in a stepped head 84 to engage with a similar head 85 on a spring-pressed pin 86 forming the other clutch-member reciprocably confined in a transverse bearing in a head 87 about a hub 88 rigidly secured upon the shaft, the pin 86 containing a notch 89, rounded at its outer side and lying in the path of the shoe 80, which normally bears against an annular flange 90 provided about the head 87 concentrically with its hub. To energize the solenoid, it is contained in a branch 91 of the motor-circuit 92. This branch also contains an electric switch 93 and a clock 94 carrying on its hour-arbor 95 (Figs. 19 and 19ª) a disk 96 provided about its periphery with irregularly spaced cam-surfaces, the three shorter ones 97 of which correspond in length and terminate in shoulders 98 and alternate with the longer cam-surfaces 99, which correspond in length and terminate in shoulders 100. A spring-pressed pivotal contact-finger 101 bears against the periphery of the disk, and a relatively shorter spring-pressed pivotal contact-finger 102, included with the other in said branch-circuit, also bears against the said periphery and is curved at its free-end, where it carries a laterally-projecting stud 103 extending into the path of the finger 101. With the switch 93 closed, the clock, in running, turns the disk 96, whereby each time the shorter finger 102 clears a shoulder its stud 103 contacts with the longer finger 101, just before the latter clears the same shoulder, to close the circuit, the closure being maintained only momentarily until the longer finger clears that shoulder, when its spring retracts it from the stud 103 to open the circuit. Each circuit-closure energizes the solenoid to raise the pin 77 and permit the clutch-member 86 to engage with the companion-member 83 and thus cause the continuously rotating motor 50 to rotate the shaft 58 to the extent of a complete revolution. At the beginning of this revolution the circuit is opened at the disk 96 to de-energize the solenoid and permit the spring-pressed shoe 80 to bear against the flange 90 until, in the rotation of the gear 57 the pin 86 is brought to the position wherein its notch 89 registers with the cam-shoe 80, whereupon the engagement of the notch with the shoe forces the clutch-member 86 away and disengages it from the member 83 to un-clutch the shaft 58 at the end of the complete rotation thereof.

The steam-supply for heating the water in circulating from each tank back to the same tank is introduced through a pipe indicated at 104 in Fig. 1 and containing a shut-off valve 105 and a steam-gage 106, the steam entering at 107 and performing its function in a suitable water-heater, the preferred type of which is that of a jet-pump device 108

(Fig. 2), having its valve-stem 109 carried by a spring-supported diaphragm 110. The jet-pump coöperates with the centrifugal pumps for circulating the water. As means for depressing the diaphragm 110 to close the valve of the jet-pump, an air-pressure controlling-device is provided, indicated at 111 in Fig. 1 and shown in detail in Fig. 4. It comprises a casing containing a vent-opening 112 and a standard 113 containing a central fluid-passage 114 having its upper end covered by a diaphragm 115, and a pipe 116 leading from its opposite end; on this standard is fulcrumed between its ends a lever 117 to bear at one end against the diaphragm, and in the opposite end of which works a set-screw 118 carrying above the casing a pointer 119 movable over a dial (not shown) in a glass-covered box 120 on the casing; this set-screw, which is accessible for adjustment, on removal of the box-cover, for regulating the bearing-pressure of the lever 117 against the diaphragm, bears against the upper end of a vertically-reciprocable rod 121 working in a valve-chamber 122 in the casing, the rod being confined against a ball-valve 123 supported against its seat from underneath by a spring 124 supplemented by air-pressure from any suitable source (not shown) admitted through a pipe 125 leading into the base of the valve-chamber, from one side of which near its upper end it communicates through a pipe 126 with the casing of the diaphragm 110. The pipe 116 connects the fluid-passage 114 with a thermostat-device 127 (Fig. 3), containing alcohol or other suitable fluid expansible and contractible under variations in temperature to actuate the diaphragm 115 to work the ball-valve 123 to regulate the admission of air pressure through the pipes 125 and 126 against the diaphragm 110 and thereby cause the valve of the jet-pump to regulate the flow of steam through it in accordance with the requirement in heating the circulating water, to which the thermostat is exposed in its position on the main valve-device, being secured to the casing thereof by a T-coupling 128 in which the thermostat extends.

The main valve-device 129, as illustrated in detail in Figs. 20 to 26, inclusive, involves the following construction: The valve-casing 130, which is best formed in the general cylindrical shape illustrated, and is closed by a cap 130ª at the bottom and by a gland 130ᵇ at the top forming a stuffing-box, has formed upon it at equal distances apart about its circumference vertical passages 131, 132, 133 and 134, each divided by a transverse partition 135 midway between its ends into an upper and a lower section. Four of these passages are shown, one for each tank, but the number thereof required to be provided will, in each instance, correspond with the number of tanks employed in the apparatus.

An opening 136 is provided in the upper section of the passage 131, its lower section containing a similar opening 137; the passage 132 contains the similar openings 138 and 139, respectively, in its upper and lower sections, similar openings 140 and 141 are provided, respectively, in the upper and lower sections in the passage 133, and similar openings 142 and 143 are provided in the upper and lower sections, respectively, of the passage 134, In a vertical series along the casing between the chambers 132 and 134 are provided the six openings numbered, in their order from top to bottom, 144 to 149, both inclusive. Fig. 23 may properly be regarded as a section taken through any one of these six openings. The hollow valve-plug 150, which fits rotatably in the casing and is closed at both ends, carries on a stem projecting from its upper end a gear-wheel 151, with which meshes a pinion 152 on the upper end of the shaft 61 to cause the plug to be rotated by the shaft 58. The last-named pinion and gear are so relatively proportioned for the purposes of the apparatus as it is shown to be constructed, as to cause each complete rotation of the shaft to turn the plug through one-eighth of its complete rotation. The valve-plug is divided at uniform intervals by horizontal partitions into a vertical series of six chambers numbered from 153 to 158, both inclusive. Each of these chambers contains a circumferential series of ports 159, those in each chamber occupying a plane coincident with that of an opening in the vertical series thereof in the casing, so that in every position of the plug each chamber therein communicates with the respective casing-opening. As shown in Figs. 25 and 26, each vertical passage on the casing-wall has formed in the latter a vertical series of six ports, each registering with an adjacent chamber in the valve-plug. The chamber 153 contains a port 160 in the plane of the uppermost ports in the inner walls of said passages; the chamber 154 contains a port 161 in the plane of the next lower ports in said inner walls; the chamber 155 contains two similar adjacent ports 162, and also, adjacent to each other, two similar by-pass ports 163, in the plane of the next lower ports in said inner walls; the chamber 156 contains ports 164 and by-pass ports 165, like those in the chamber 155 but occupying the plane of the next lower ports in the inner walls of said vertical passages; and the chambers 157 and 158 contain, respectively, ports 166 and 167 in planes corresponding with those of the next lower and lowermost ports in said inner walls.

In Fig. 21 and in Figs. 24—26, inclusive, the valve-plug is shown to be provided about its ends and about its wall between each pair of chambers in the plug with circumferential grooves 150ª to receive packing, the material preferably used for the packing purpose being a heavy grease that will resist melting under the temperature in the valve, a suitable compound being what is known as a graphite-mixture.

The pipe-connections with the valve-device 129 are, for the sake of simplicity and to avoid confusion, indicated by dotted representation in Fig. 1. Each tank is provided in one side with an upper port 168 and a lower port 169. A pipe 170 leads from the upper port in tank W to the opening 138 in the casing of the valve-device; a pipe 171 leads from the upper port in tank X to the opening 140; a pipe 172 leads from the corresponding port in the tank Y to the valve-device opening 136, and similarly a pipe 173 connects the port 168 with the opening 142 of the valve-device. A pipe-connection 174 leads from the lower port 169 in the tank W to the opening 139 in the valve-device, and the corresponding ports in the tanks X, Y and Z are respectively connected by pipes 175, 176 and 177 with the openings 141, 137 and 143 in the lower part of the valve-device.

Of the vertical series of six openings in the valve-casing 130, the second one from the top, namely 145, is connected by a pipe 178 with the suction-side of the pump 54, the discharge-side of which is connected by a pipe 179 with the uppermost opening 144; the third opening 146 in the series is connected by a pipe 180 with the suction-side of the pump 55, the discharge-side of which is connected by a pipe 181 with the jet-pump 108, and the latter is connected from its lower discharge-end by a pipe 182 with the fourth opening, 147, in the series; a pipe 183 leads from the fifth opening, 148, to the suction-side of the pump 56, and a pipe 184 connects the discharge-side of this pump with the lowermost opening 149. A supplemental valve-device 185, the construction of which is shown in Figs. 16 and 17, is connected at the inlet in its lower end by a pipe 186, containing a shut-off valve 187, with the water-supply pipe 42; and a branch-pipe 188 connects this supplemental valve from its discharge-side with the opening 149. The stem of the valve 185 carries a pinion 189 meshing with the gear 151 and bearing thereto the relation of 1 to 2. The purpose of the valve 185 may best be explained in this connection to be that of supplying cold-water to the circulation when needed to reduce excessive temperature therein, this supply being controllable through the shut-off valve 187.

The stem on the upper end of the valve-plug 150 carries an indicator 190, the preferred construction of which is illustrated in Figs. 10 and 11: An upright drum 191, secured to the stem, contains a circumferential series of glass-covered openings 192 at uniform distances apart and is inclosed in a stationary shell 193 containing a display-opening 194 and having a bracket 195 extending from it by which to fasten it to any stable support. The shell is surmounted by a removable hood 196 carrying an incandescent electric lamp, as indicated, to depend centrally in the indicator-drum, and adapted to be connected with a source of electric current (not shown). Thus the drum rotates with the valve-plug 150 to display at each quarter-revolution thereof at the point 194 a different character provided on the glass of the respective opening 192 indicating the one of the series of tanks in which the pasteurizing operation has been completed and requiring to be emptied of and refilled with beer to be treated.

The operation is as follows, starting with the valve in the "1st position": The four tanks being filled with cold water admitted through the pipe 42 and its branches, with the valve 46 closed (being only opened with the valve 43 closed when it is desired to empty the tanks into the sewer), the motor 50 is started to work the centrifugal pumps continuously and drive the shaft 58 intermittently; the steam having meantime been turned on by opening the valve 105. For starting, the switch 93 is left open and the magnet 72 is tripped by hand to operate the valve-device 129 the first three times for preparing the tanks by heating the water in one to the pasteurizing temperature of about 48° R., and that of another to a lower temperature of, say, about 20° R., leaving the water in the other two tanks at the natural temperature of 10° to 15° R. at which it is adapted for receiving beer in bottles, with which one of these tanks is the first to be supplied. With the valve in the "1st position" (Figs. 27—27°) the circulation, indicated by arrows in Fig. 1, is as follows: from the top of tank W through pipe 170 to the valve-opening 138 and into the upper section of the passage 132 (Fig. 25), whence it enters the plug-chamber 155 and passes out through a port 159 of that chamber by way of the opening 146 (Fig. 24) into the pipe 180 under the suction-action of the pump 55 (Fig. 1), which discharges it through the pipe 181 into the jet-pump 108 where it is heated and whence it passes by way of the pipe 182 to the valve-opening 147 leading to the plug-chamber 156 (Fig. 24); thence it flows into the lower section of the passage 132 (Fig. 25) and out at the opening 139 through pipe 174 back into the tank W at its port 169. At the same time the pipe 173 leading from the upper port in the tank Z to the opening 142 conducts water from that tank into the upper section of the passage 134 (Fig. 26), whence it enters the plug-chamber 155 through a by-pass port 163 and passes out through a port 159 to the opening 146 (Fig. 24), from which the pipe 180 connects with the suction-side of the pump 55, which also forces that water through the pipe 181 into the jet-pump to flow therefrom through the pipe 182, with the water from tank W, into the plug-chamber 156, whence a by-pass port 165 (Fig. 24) conducts the same quantity of water that was taken from the tank Z, in heated condition back to the same tank through the lower section of the passage 134 (Fig. 26) and through the pipe 177 leading from that chamber to the port 169 in tank Z. Under the hand-operation of the magnet 72 the described circulation may be maintained for any length of time (say about 30 to 45 minutes) required to heat the water in tank W to about 30° R. and that in tank Z to about 20° R.

While the described circulation is taking place, water is being transferred (incidentally in the starting operation) from the top of tank Y to the top of tank Z and from the bottom of tank X to the bottom of tank Y: through pipe 172 and opening 136 into the upper section of passage 131 (Fig. 25), thence into plug-chamber 154 and out through a port 159 and opening 145 by way of pipe 178 to the suction-side of the pump 54, which discharges through pipe 179 into plug-chamber 153 at the opening 144 (Fig. 24), and from this chamber the flow enters the upper section of the passage 133 (Fig. 26) and continues therefrom through the opening 140 and pipe 171 into the top of tank X. The pipe 175 takes water from the bottom of tank X to the valve-opening 141 and introduces it into the lower section of the passage 133 (Fig. 26), whence it enters the plug-chamber 157 to discharge therefrom through a port 159 and opening 148 to the suction-side of pump 56 through pipe 183, and the pump discharges through the pipe 184 into the plug-chamber 158 at 149 (Fig. 24), whence the flow continues through the port 167 into the lower section of the passage 131 and through opening 137 (Fig. 25) and pipe 176 to the port 169 in tank Y. The operator then trips the clutch by hand to permit the shaft 58 to rotate the valve-plug through one-eighth of a revolution, thereby bringing the valve-device to the "2nd position" (Figs. 28—28ᵉ), in which the circulation takes place as follows to raise the water in tank W to the sterilizing temperature of about 48° R. and that in tank Z to about 35° R. The course of the water to and from tank W and to and from tank Z remains the same as described, with the valve-device in the first position, except that its transfer-ports are closed in the "2nd position". While the valve occupies this second position, which is maintained until the aforesaid temperatures are reached, the gauntree 48 is run on the track to extend over the tank Y, containing cold water, there to raise a bottle-rack stored therein into position for loading it with baskets containing bottled beer to be pasteurized; and the rack is thereupon lowered by the gauntree into the tank. The operator, now, again trips the clutch by hand, thereby causing the shaft 58 to rotate the valve-plug through the second eighth of a revolution to the "3rd position" (Figs. 29—29ᵉ), and thereby cause the circulation to ensue as follows, to raise the temperature of the water in tank X to about 20° R. and through the by-pass maintain that in tank W at 48° R: through pipe 171 and opening 140 into the upper section of passage 133, thence into chamber 155, from which it continues to the suction-side of the pump 55 through opening 146 and pipe 180 and its discharge through pipe 181, the jet-pump, and pipe 182 through opening 147 into plug-chamber 156, thence to the lower section of passage 133 through opening 141 and pipe 175 back to tank X. To maintain the temperature in tank W through the by-pass, the flow is through pipe 170 and opening 138 into the upper section of the passage 132, thence into plug-chamber 155, continuing through the pipe 180 from the opening 146 to the suction-side of the pump 55, thence through pipe 181, the jet-pump and the pipe 182 to the opening 147 and chamber 156 opening into the lower section of the passage 132 from the opening 139, in which it continues through the pipe 174 back to tank W. With the valve in this "3rd position", transfer of water is taking place from the top of tank Z to the top of tank Y to raise the temperature in the latter to about 25° R. for warming the beer therein, this transfer occurring through pipe 173 and opening 142 into the upper section of passage 134, thence into chamber 154, from the latter by way of opening 145 and pipe 178 to the suction-side of pump 54, thence through pipe 179 and opening 144 into plug-chamber 153 and into the upper section of passage 131, and through the opening 136 and pipe 172 back to tank Y. Transfer is also then taking place from the bottom of tank Y to the bottom of tank Z to lower the temperature in the latter to about 20° R. for preparing it to receive bottles, this transfer being effected through pipe 176 to opening 137 in the lower section of passage 131, thence into chamber 157, through opening 148 and pipe 183 to the suction-side of pump 56, thence through pipe 184, opening 149 and chamber 158 into the lower section of passage 134, and through pipe 177 leading from opening 143 back to tank Z. The clutch is again tripped, for the third and last time by hand, to permit the shaft 58 to turn the valve-plug through the third eighth of its rotation and set the valve at its "4th position", in which beer is placed in tank Z, wherein the water is at about 20° R.; and in this position the water in tank X is still being heated to raise it to the absolute temperature of 48° R. while the water in tank W is being held, through the medium of the by-pass, at 48° R. This circulation is the same as that described as taking place to maintain the temperature in tank W and raise it in tank X, the transfer-ports in the valve-device, however, being then closed; so that that description need not be repeated in the present connection.

Thenceforth the operation of the apparatus throughout an entire run is automatic, except as to introducing the beer into and removing it from tanks, and as to turning the valve 187 to introduce cooling water into and shut it off from the circulation. The disk 96 on the clock arbor 95 has its cam-surfaces 99 arranged each to maintain the contact-fingers out of engagement for a period of twelve minutes and its cam-surfaces 97 each to maintain them out of such engagement for a period of eight minutes, so that the circuit is kept open for alternate periods of eight minutes during each of which to maintain the valve-device set for initially heating one tank, by-passing heat into another tank and transferring from one to the other of the other tanks; and it is kept open for intermediate periods of twelve minutes, during each of which to maintain the valve-device set for maintaining by the by-pass the pasteurizing temperature in one tank and raising the other tank to the pasteurizing temperature. This automatic action ensues upon closure of the switch 93 to cause the clock-movement to energize the magnet 72 momentarily each time the shorter finger 102 clears the shouldered end of a cam on the disk 96, the resultant energizing of the magnet freeing the clutch member 86 to permit it to engage with the companion-member 83 and thus cause the constantly rotating motor-shaft to turn the shaft 58 through one complete revolution, whereby its gear-connection with the valve-plug 150 turns the latter through one-eighth of its complete rotation to bring the ports into the eight different positions required for handling the four tanks.

To avoid confusion on the part of the attendant, the clock should be set for each run of the apparatus before closing the switch, to begin the automatic operation with the hands pointing to the full hour or either twenty or forty minute divisions of the hour, since the circuit-closure occurs at intervals of eight and twelve minutes and the attendant is thus the better enabled to time the intervals when away from the apparatus and is not obliged to depend upon the sounding of the alarm by ringing of the gong 62. The gong is only sounded by alternate revolutions of the shaft 58, since during its intermediate revolutions the segmental rack 68 is out of engagement with the pawl 69, the gearing between the shaft 58 and gear 66 being 1 to 2; and the sounding of the gong begins with each twelve-minutes interval to notify the attendant of the condition of the apparatus requiring a supply of beer to be introduced into a tank for treatment, or that the beer treated in a tank is ready to be removed and supplanted by a fresh charge. In this connection the indicator 190 coöperates to display at the opening 194, during the sounding of the alarm, the particular tank ready to be emptied and recharged.

As will be understood, the provision in the course of circulation of the thermostat-device for controlling the admission of air-pressure upon the diaphragm 110, and the adjustment afforded by the set-screw 118, enable accurate regulation of the valve of the jet-pump to introduce more or less steam into the circulating water according to undue rise or fall in the temperature thereof. The valve-device having remained at the "4th position" for the desired period will, upon the adjustment of the switch and setting of the clock as hereinbefore described, thereafter be turned automatically at intervals of eight and twelve minutes throughout the run, to set it to its different positions. At the end of the "4th position" period, therefore, the valve-plug will be turned to the "5th position", (Figs. 31—31ª), to remain for eight minutes. In that period the tank Y is heated to the sterilizing temperature, at which the tank X is maintained through the by-pass, water is transferred from the top of tank W to the top of tank Z for warming the contents of the latter to about 30° R., and water is transferred from the bottom of tank Z to that of tank W for reducing the temperature of the latter to about 28° R. The course of circulation then is the following: through pipe 172 to opening 136 into the upper section of passage 131, thence into plug-chamber 155 through opening 146, by pipe 180 to the suction-side of the pump 55, through pipe 181, the jet-pump, pipe 182 and opening 147 into chamber 156; thence into the lower section of passage 131, and through opening 137 and pipe 176 to tank Y to raise the temperature therein to about 38° R. for further heating the beer. For holding the temperature at 48° R. in the tank X the circulation is through pipe 171, opening 140, upper section of passage 133, chamber 155, opening 146 and pipe 180 to the suction-side of the pump 55, thence through pipe 181, the jet-pump, pipe 182, opening 147, plug-chamber 156, lower section of passage 133, opening 141 and pipe 175 back to the tank X. For transferring water from the top of tank W to the top of tank Z the course is through pipe 170, opening 138, upper section of passage 132, chamber 154, opening 145 and pipe 178 to the suction-side of pump 54; thence through pipe 179, opening 144, plug-chamber 153, upper section of passage 134, opening 142 and pipe 173 to tank Z for raising the temperature therein to about 30° R. For transferring water from the bottom of tank Z to the bottom of tank W, to reduce the temperature in the latter to about 28° R., the course is through pipe 177, opening 143, lower section of passage 134, chamber 157, opening 148 and pipe 183 to the suction-side of pump 56; thence through pipe 184, opening 149, plug-chamber 158, lower section of passage 132, opening 139 and pipe 174 to tank W. At the end of this eight-minutes period of the valve, the rotation of shaft 58 turns it to the "6th position", (Figs. 32—32$^e$), in which tank Y is raised to the pasteurizing temperature of 48° R. and tank X is held at that temperature through the by-pass flow. In this period beer is placed in tank W by the use of the gauntree, the temperature of this tank being, as aforesaid, about 28° R. The circulation for these purposes is precisely the same as that described in relation to the "5th position" of the valve and may, therefore, be readily traced with the aid of that description, bearing in mind, however, that no transfer takes place between tanks in this position of the valve, wherein it closes the transfer ports.

At the end of the twelve-minutes period of the last-described position of the valve, its operating shaft turns it to the "7th position" (Figs. 33–33$^e$), for raising the temperature of tank Z to about 38° R., maintaining tank Y at the pasteurizing temperature through the by-pass, transferring water from the top of tank X to the top of tank W to raise the temperature in the latter to about 35° R., and for transferring water from the bottom of tank W to the bottom of tank X to lower the latter to about 28° R. For the first-named purpose the course is through pipe 173, opening 142, upper section of passage 134, chamber 155, opening 146 and pipe 180 to the suction-side of pump 55; thence through pipe 181, the jet-pump, pipe 182, opening 147, chamber 156, lower section of passage 134, opening 143 and pipe 177 to tank Z. The by-pass flow from tank Y is through pipe 172, opening 136, upper section of passage 131, chamber 155, opening 146 and pipe 180 to the suction-side of pump 55; thence through pipe 181, the jet-pump, pipe 182, opening 147, chamber 156, lower section of passage 131, opening 137 and pipe 176 back to tank Y. The course of the transfer from the top of tank X to that of tank W is through pipe 171, opening 140, upper section of passage 133, chamber 154, opening 145, and pipe 178 to the suction-side of pump 54; thence through pipe 179, opening 144, chamber 153, upper section of passage 132, opening 138 and pipe 170 to tank W. The course of the transfer from the bottom of tank W to the corresponding part of tank X is through pipe 174, opening 139, lower section of passage 132, chamber 157, opening 148 and pipe 183 to the suction-side of pump 56; thence through pipe 184, opening 149, chamber 158, lower section of passage 133, opening 141 and pipe 175 to tank X.

At the end of the last-described eight-minutes period, the valve-plug is turned to the eighth and last position (Figs. 34–34$^e$) for raising tank Z to the pasteurizing temperature and maintaining through the by-pass that temperature in tank Y. Aside from there being no transfer between tanks in this position, the circulation is the same as that in the "7th position" and may be traced by the description thereof with the aid of the drawings. In this period, tank X is supplied by the use of the gauntree with beer to be pasteurized.

As will be understood, the succeeding first, second, third and fourth positions of the valve-device, as also the remaining positions, will be attained successively by the automatic action of the mechanism provided for the purpose, throughout the remainder of the run of the apparatus, one tank, during each twelve-minutes period, being emptied of its contained supply of sterilized beer and refilled with a fresh supply of the bottled article to be sterilized.

There still remains to be explained the purpose of the lever 78 (Fig. 6): The wheel in the train 57 which immediately coöperates with the clutch-mechanism, when rotating very rapidly, is liable to be too quick for the action of the solenoid when deënergized, because of residual magnetism. To insure the prompt release, then, of the pin 77, the clutch-member 86, in the rotation of the hub 88, encounters the lever 78 and turns it, against the resistance of its returning spring 278, to disconnect the hook of the link 75 from the stud 76 to release the pin 77 and permit it to be depressed by its controlling spring to effect the unclutching operation. When the member 86 has cleared the lever, the spring 278 actuates the latter to again engage the hook with the stud 76 then in position to be so engaged by deënergizing of the magnet.

What I claim as new and desire to secure by Letters Patent is—

1. In a pasteurizing apparatus, the combination of a plurality of sterilizing tanks, water-circulating pipes communicating with said tanks with a heater and pumping mechanism included in the circulation, a multiple-valve device with which said pipes communicate constructed and arranged to direct, in its various positions, the circulation for the different steps in the sterilizing operation in said tanks, and means for automatically setting the valve-device at predetermined intervals to its different positions.

2. In a pasteurizing apparatus, the combination of a plurality of sterilizing tanks, each provided with an overflow-opening leading to an overflow-chamber formed in said tanks and provided with an outlet, water-circulating pipes communicating with said tanks with a heater and pumping mechanism included in the circulation, a multiple-valve device with which said pipes communicate constructed and arranged to direct, in its various positions, the circulation for the different steps in the sterilizing operation in said tanks, and means for automatically setting the valve-device at predetermined intervals to its different positions.

3 In a pasteurizing apparatus, the combination of a plurality of sterilizing tanks formed of a continuous shell provided with end-heads and containing partitions having overflow-openings, dividing said shell into tanks and forming overflow-chambers between them provided with outlets, water-circulating pipes communicating with said tanks with a heater and pumping mechanism included in the circulation, a multiple-valve device with which said pipes communicate constructed and arranged to direct, in its various positions, the circulation for the different steps in the sterilizing operation in said tanks, and means for automatically setting the valve-device at predetermined intervals to its different positions.

4. In a pasteurizing apparatus, the combination of a plurality of sterilizing tanks, water-circulating pipes communicating with said tanks, pumping mechanism included in the circulation, and a heater included therein provided with means for automatically regulating its heating function, a multiple-valve device with which said pipes communicate constructed and arranged to direct, in its various positions, the circulation for the different steps in the sterilizing operation in said tanks, and means for automatically setting the valve-device at predetermined intervals to its different positions.

5. In a pasteurizing apparatus, the combination of a plurality of sterilizing tanks, water-circulating pipes communicating with said tanks with a heater and pumping mechanism included in the circulation, a multiple-valve device with which said pipes communicate constructed and arranged to direct, in its various positions, the circulation for the different steps in the sterilizing operation in said tanks, a motor geared to the valve-plug of said device, and an electrically-operated timed clutch-device coöperating with the gearing to turn the valve-plug to its different positions at predetermined intervals.

6. In a pasteurizing apparatus, the combination of a plurality of sterilizing tanks, water-circulating pipes communicating with said tanks with a heater and pumping mechanism included in the circulation, a multiple-valve device with which said pipes communicate constructed and arranged to direct, in its various positions, the circulation for the different steps in the sterilizing operation in said tanks, a drive-shaft for said device geared to the valve-plug thereof, a motor geared to said shaft, a clutch-device coöperating with the gears, an electromagnet operatively connected with the clutch-device, an electric circuit containing the electromagnet, and automatic means for closing said circuit at predetermined intervals to energize said magnet, for the purpose set forth.

7. In a pasteurizing apparatus, the combination of a plurality of sterilizing tanks, water-circulating pipes communicating with said tanks with a heater and pumping mechanism included in the circulation, a multiple-valve device with which said pipes communicate constructed and arranged to direct, in its various positions, the circulation for the different steps in the sterilizing operation in said tanks, a drive-shaft for said device geared to the valve-plug thereof, a motor geared to said shaft, a clutch-device coöperating with the gears, an electromagnet operatively connected with the clutch-device, an electric circuit containing the electromagnet, a clock carrying on an arbor thereof a cam-disk, and electric contact-fingers included in said circuit and coöperating with the cams on said disk to close the magnet-circuit at predetermined intervals, for the purpose set forth.

8. In a pasteurizing apparatus, the combination of a plurality of sterilizing tanks, water-circulating pipes communicating with said tanks with a heater and pumping mechanism included in the circulation, a multiple-valve device with which said pipes communicate constructed and arranged to direct, in its various positions, the circulation for the different steps in the sterilizing operation in said tanks, a drive-shaft for said device geared to the valve-plug thereof, a motor geared to said shaft, a clutch-device coöperating with the gears, an electromagnet operatively connected with the clutch-device, an electric circuit containing the electromagnet, a clock, a disk on an arbor of the clock having formed upon it two series of relatively longer and shorter cams, the members of each series alternating with those of the other series, and a pair of spring-pressed electric contact-fingers, one longer than the other, engaging said cams, for the purpose set forth.

9. In a pasteurizing apparatus, the combination of a plurality of sterilizing tanks, water-circulating pipes communicating with said tanks with a heater and pumping mechanism included in the circulation, a multiple-valve device with which said pipes communicate constructed and arranged to direct, in its various positions, the circulation for the different steps in the sterilizing operation in said tanks, a drive-shaft for said device geared to the valve-plug thereof, a motor geared to said shaft, a clutch-device coöperating with the gears, an electromagnet releasably connected with the clutch-device, an electric circuit containing the electromagnet, automatic means for closing said circuit at predetermined intervals to energize said magnet and release the clutch, and a spring-pressed lever-device forming supplemental means for disconnecting said magnet from the clutch.

10. In a pasteurizing apparatus, the combination of a plurality of sterilizing tanks, water-circulating pipes communicating with said tanks with a heater and pumping mechanism included in the circulation, a multiple-valve device with which said pipes communicate constructed and arranged to direct, in its various positions, the circulation for the different steps in the sterilizing operation in said tanks, means for automatically setting the valve-device at predetermined intervals to its different positions, a water-supply pipe having valved connections with said tanks, and a supplemental valve geared to said valve-device and having a valved pipe-connection with said supply-pipe, for the purpose set forth.

11. In a pasteurizing apparatus, the combination of a plurality of sterilizing tanks each provided with upper and lower ports, a pipe leading from each upper port and a pipe leading to each lower port, a multiple-valve device having an upper circumferential series of openings in its casing each connected with one of the first-named pipes and a similar series of lower openings with each of which one of said last-named pipes connects, and a vertical series of openings in the casing, a thermostat-controlled jet-pump, a motor having a clutch-controlled gear-connection with the valve-plug, a series of pumps operatively connected with the motor-shaft and each having a circulating-pipe connection with two of the openings in said vertical series, the circulating-pipe connection of one of said pumps containing said jet-pump, and means for automatically setting the plug of the valve-device at predetermined intervals to its different positions, for the purpose set forth.

12. In a pasteurizing apparatus, the combination of a plurality of sterilizing tanks each provided with upper and lower ports, a pipe leading from each upper port and a pipe leading to each lower port, a multiple-valve device having an upper circumferential series of openings in its casing each connected with one of the first-named pipes and a similar series of lower openings with each of which one of said last-named pipes connects, and a vertical series of openings in the casing, a jet-pump device provided with a diaphragm-supported valve, a fluid-pressure valve-device connected with said diaphragm, a thermostat controlling the valve in said fluid-pressure device, a motor having a clutch-controlled gear-connection with the plug of the multiple-valve device, a series of pumps operatively connected with the motor-shaft and each having a circulating-pipe connection with two of the openings in said vertical series, the circulating connection with one of said pumps containing said jet-pump, and means for automatically setting said plug at predetermined intervals to its different positions, for the purpose set forth.

13. In a pasteurizing apparatus, the combination of a plurality of sterilizing tanks each provided with upper and lower ports, a pipe leading from each upper port and a pipe leading to each lower port, a motor, a multiple-valve device having its rotary plug geared to said motor and provided with an indicator, with an electrically-operated timed clutch-device coöperating with the gearing to turn the valve-plug to its different positions at predetermined intervals, a circumferential series of openings in the upper part of the valve-casing each connected with one of the first-named pipes and a similar series of lower openings therein with each of which one of said last-named pipes connects, and a vertical series of openings in the casing, a series of pumps on the motor-shaft each having a circulating-pipe connection with two of the openings in said vertical series, and a jet-pump contained in said pipe-connection of one of said pumps, for the purpose set forth.

14. In a pasteurizing apparatus, the combination of a plurality of sterilizing tanks, water-circulating pipes communicating with said tanks with a heater and pumping mechanism included in the circulation, a multiple-valve device comprising a shell having an external series of passages divided into upper and lower sections having openings and provided with ports in the casing-wall, and a longitudinal series of openings, with which said various openings said circulating pipes connect, and a hollow plug rotatably confined in the casing and divided into a series of chambers having ports, including by-pass ports in certain chambers, constructed and arranged to direct, in the various positions of the plug, the circulation for the different steps in the sterilizing operation in said tanks, and means for automatically setting the plug at predetermined intervals to its different positions.

15. In a pasteurizing apparatus, the combination of a plurality of sterilizing tanks, water-circulating pipes communicating with said tanks with a heater and pumping mechanism included in the circulation, a multiple-valve device comprising a shell having an external series of passages divided into upper and lower sections, having openings and provided with ports in the casing-wall, and a longitudinal series of openings, with which said various openings said circulating pipes connect, and a hollow plug rotatably confined in the casing, having circumferential packing-confining grooves in its wall and divided into a series of chambers having ports, including by-pass ports in certain chambers, constructed and arranged to direct, in the various positions of the plug, the circulation for the different steps in the sterilizing operation in said tanks, and means for automatically setting the plug at predetermined intervals to its different positions.

16. In a pasteurizing apparatus, the combination of a plurality of sterilizing tanks, water-circulating pipes communicating with said tanks with a heater and pumping mechanism included in the circulation, a multiple-valve device comprising a shell having an external series of passages divided into upper and lower sections with an opening in each section and ports in the inner wall thereof, and a longitudinal series of openings between a pair of said passages, with which said various openings said circulating pipes connect, a hollow plug rotatably confined in the casing and divided into a circumferential series of chambers each having a series of ports, each of the first, second, fifth and sixth chambers containing an additional port in a different plane from that containing the series thereof and the third and fourth chambers containing such additional ports and also by-pass ports, said ports being constructed and arranged to direct, in the various positions of the plug, the circulation for the different steps in the sterilizing operation in said tanks, and means for automatically setting the plug at predetermined intervals to its different positions.

JOHN T. H. PAUL.

In presence of—
RALPH SCHAEFER,
W. T. JONES.